US008244676B1

(12) United States Patent
Uygur

(10) Patent No.: US 8,244,676 B1
(45) Date of Patent: Aug. 14, 2012

(54) HEAT CHARTS FOR REPORTING ON DRIVE UTILIZATION AND THROUGHPUT

(75) Inventor: Halit Uygur, Greenwich, CT (US)

(73) Assignee: Symantec Corporation, Mountain View, CA (US)

( * ) Notice: Subject to any disclaimer, the term of this patent is extended or adjusted under 35 U.S.C. 154(b) by 546 days.

(21) Appl. No.: 12/242,151

(22) Filed: Sep. 30, 2008

(51) Int. Cl.
*G06F 7/00* (2006.01)

(52) U.S. Cl. ........ 707/634; 707/654; 707/812; 715/201; 715/227

(58) Field of Classification Search .................. None
See application file for complete search history.

(56) References Cited

U.S. PATENT DOCUMENTS

| | | | |
|---|---|---|---|
| 6,611,723 B1 * | 8/2003 | Kehrer et al. | 700/26 |
| 7,539,706 B1 * | 5/2009 | Campbell | 1/1 |
| 2002/0177907 A1 * | 11/2002 | Hand et al. | 700/1 |
| 2005/0216428 A1 * | 9/2005 | Yagawa | 707/1 |
| 2006/0053261 A1 * | 3/2006 | Prahlad et al. | 711/162 |
| 2006/0218204 A1 * | 9/2006 | Ofer et al. | 707/201 |
| 2007/0070907 A1 * | 3/2007 | Kumar et al. | 370/235 |
| 2007/0250829 A1 * | 10/2007 | Hillier et al. | 717/170 |

\* cited by examiner

*Primary Examiner* — Debbie Le
*Assistant Examiner* — Hasanul Mobin
(74) *Attorney, Agent, or Firm* — Campbell Stephenson LLP

(57) ABSTRACT

The present invention includes a method, apparatus, and computer-readable medium. According to an embodiment of the present invention, metadata representing a backup operation is retrieved from a log. The backup operation includes backing up data to at least one storage device. A storage metric for the storage device is calculated using the metadata. The storage metric is graphically displayed.

24 Claims, 13 Drawing Sheets

| Operation ID 302 | Time 304 | Daemon 306 | backuplogmessage 308 |
|---|---|---|---|
| 343215 | 2XXX-12-10 16:15:27 | bpsched | added backup job (jobid = 1302172) for client x |
| 343215 | 2XXX-12-10 16:15:28 | bpsched | started backup job for client x |
| 343215 | 2XXX-12-10 16:15:38 | bpsched | client x handling path c:\ |
| 343215 | 2XXX-12-10 16:17:04 | bptm | begin writing backup id client x, copy 1, frag 1 to media id x on drive index x |
| 343215 | 2XXX-12-10 16:17:41 | bptm | successfully wrote backup id client x, copy 1, frag 1, x Kbytes at x Kbytes/sec |
| 343215 | 2XXX-12-10 16:18:13 | bptm | begin writing backup id client x, copy 1, frag 2 to media id x on drive index x |
| 343215 | 2XXX-12-10 16:18:40 | bptm | successfully wrote backup id client x, copy 1, frag 2 x Kbytes at x Kbytes/sec |
| 343215 | 2XXX-12-10 16:30:41 | bptm | begin writing backup id client x, copy 1, frag 1 to media id x on drive index x |
| 343215 | 2XXX-12-10 16:45:44 | bptm | successfully wrote backup id client x copy 1, frag 3, x Kbytes at x Kbytes/sec |
| 343215 | 2XXX-12-10 16:45:44 | bptm | begin writing backup id client x, copy 1, frag 1 to media id x on drive index x |
| 343215 | 2XXX-12-10 16:54:07 | bptm | successfully wrote backup id client x copy 1, frag 3, x Kbytes at x Kbytes/sec |
| 343215 | 2XXX-12-10 16:54:08 | bpsched | CLIENT x EXIT STATUS 1 (the requested operation was partially successful) |
| 343215 | 2XXX-12-10 16:54:08 | bpsched | backup of client x exited with status 1 (the requested operation was partially successful) |

*Fig. 3A*

| Report Wizard 381 | | | |
|---|---|---|---|
| ○ Relative Date | | ○ Absolute Date | |
| Show Last: | 15 | Day(s) | |

| Report Time Frame Grouping 382 |
|---|
| Group By: [1] [Hour of the Day (Average)] |

| Display Options 384 | | | |
|---|---|---|---|
| Color Code Ranges: | 00-24% [ ] | 25-49% [▓] | 51-74% [▓] | 75-100% [■] |

Fig. 3C

HEAT CHARTS FOR REPORTING ON DRIVE UTILIZATION AND THROUGHPUT

BACKGROUND OF THE INVENTION

1. Field of the Invention

The present invention relates to the field of optimizing networked data processing systems, and particularly to a method and system of generating diagnostic resources to facilitate the optimization or networked data processing systems.

2. Description of the Related Art

Many modern businesses operate computer networks that include at least one central server computer and a collection of client computers. It will be appreciated that periodic backup of the data on such a collection of client computers helps reduce the chance of data loss, in the event of the failure of one or more client computers. As a business grows, more and more client computers may be added to the computer network, which results in increased demands on the server. System administrators often struggle with balancing available server resources and the demand the client computers place on those server resources. Such a balance is herein referred to "capacity planning." An example of a server resource is the storage capacity of storage devices coupled to the server.

In the past, system administrators have not been able to reliably determine the number of storage devices that should be coupled to a server to efficiently provide service to clients. If too few storage devices are coupled to a server, clients requesting services from the server will encounter service delays. If there are too many storage devices coupled to the server, some storage devices will remain idle, which results in wasted resources, because some of the storage devices are not in use. Thus, there is a need for a more effective and reliable system for managing capacity planning on a network.

SUMMARY OF THE INVENTION

The present invention includes a method, apparatus, and computer-readable medium. According to an embodiment of the present invention, metadata representing a backup operation is retrieved from a log. The backup operation includes backing up data to at least one storage device. A storage metric for the storage device is calculated using the metadata. The storage metric is graphically displayed.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3A illustrates an example of a metadata log.

FIG. 3C illustrates an example of a report wizard.

DETAILED DESCRIPTION

Introduction

Embodiments of the present invention provide for the generation and display of heat charts that report on the operation of storage devices over a predetermined period of time. As will be appreciated, the use of heat charts is an effective, simple and easily understandable mechanism for visually displaying a large number of data values. By displaying various shades of a color for each data value, storage metrics for a collection of storage devices can be effectively presented for a large number of storage devices across a predetermined time period by displaying a particular storage metric as a shade of a base color. The use of shading ensures that the details for any one storage device are not lost and have equal representation as the details for the rest of the storage devices.

When a client or server (via, for example, a backup manager) initiates a backup operation of data stored on a client, a metadata log stores metadata that detail the backup operation. Upon receiving (e.g., from a user or another application) a request to generate a heat chart of a particular storage metric, a storage metric manager parses the metadata log and extracts metadata pertaining to the particular storage metric and enters the extracted metadata into a table that includes a collection of cells. The storage metric manager calculates the particular storage metric for each cell in the table. Once calculated, the storage metric manager stores the calculated storage metric in each cell in the table. A color identifier is then assigned to each cell in the table, depending on the calculated storage metric in each cell. Finally, the storage metric manager generates the requested heat chart by graphically displaying the table with the cells colored according to the color identifier. According to an alternative embodiment of the present invention, the color identifier is generated in response to user input from a report wizard without storing the color identifier in the table.

Examples of architectures and processes are now provided. These examples describe in greater detail the elements and operations that can be employed to generate heat charts for the reporting of storage metrics, in certain embodiments of the present invention.

An Example Architecture for Heat Chart Generation

Figure 1:
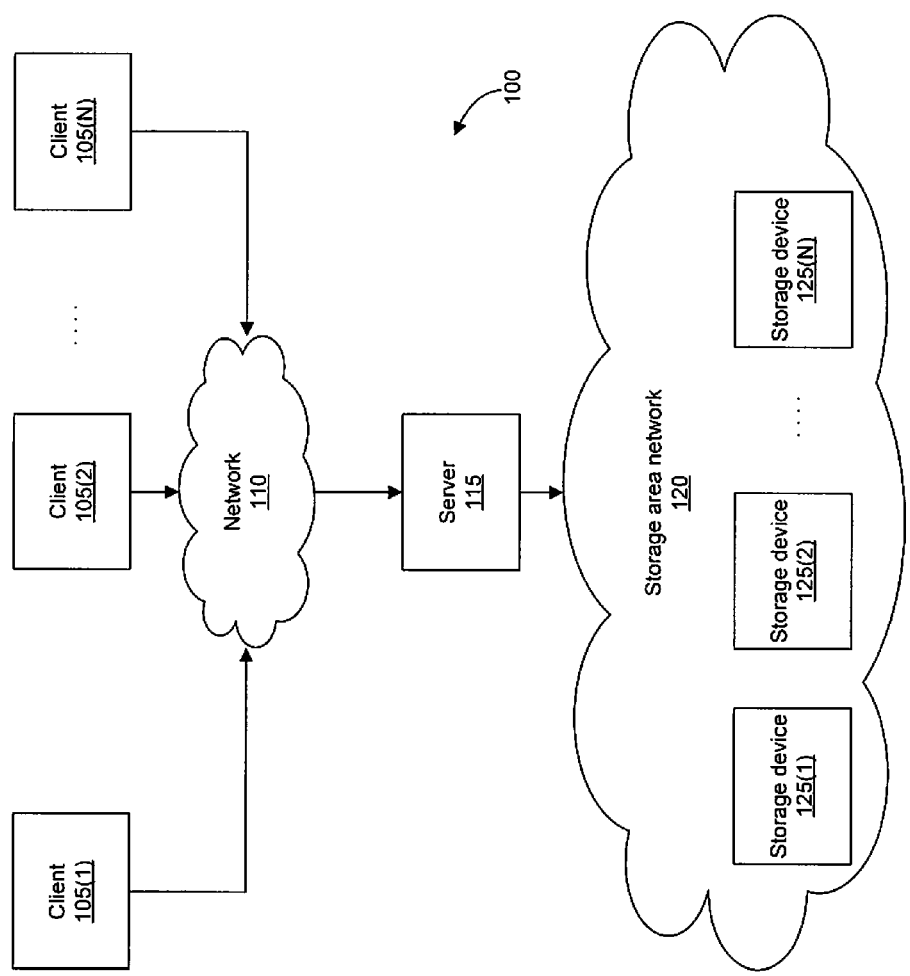
FIG. 1 is a simplified block diagram illustrating an example of a network architecture in which one or more clients have network access to a server that is coupled to a storage area network.

FIG. 1 is a simplified block diagram illustrating a network architecture 100 in which one or more clients are provided with access to a server via various network connections. As depicted in FIG. 1, clients 105(1)-105(N) are coupled to a network 110, and so are able to access a server 115 via network 110. A client can be implemented using, for example, a desktop computer, a laptop computer, a workstation, a server, a cell phone, a smart phone, a network-enabled personal digital assistant, PDA or the like. An example of network 110, which can be used by clients 105(1)-105(N) to access server 115, is the Internet. Alternatively, access to server 115 can be provided by a local area network (LAN) utilizing Ethernet, IEEE 802.11x, or some other communications protocol. As will be appreciated, server 115 can be accessed by clients coupled directly thereto (not shown).

As also depicted in FIG. 1, server 115 is coupled to a storage area network (SAN) 120. SAN 120 includes a collection of storage devices 125(1)-125(N). A storage area network such as SAN 120 couples remote storage devices to a server (e.g. server 115), such that the remote storage devices appear as locally attached storage devices to the server's operating system, for example.

In light of the present disclosure, those of skill in the art will appreciate that storage devices 125(1)-125(N) can be implemented by any type of storage device including, but not limited to internal or external hard disk drives (HDD), optical drives (e.g., CD-R, CD-RW, DVD-R, DVD-RW and the like), flash memory drives (e.g., USB memory sticks and the like), tape drives and the like. Alternatively, those of skill in the art will also appreciate, in light of the present disclosure, that storage devices 125(1)-125(N) can be directly coupled to server 115 (not shown). Those of skill in the art will further appreciate that example network 100 may include other components such as routers, firewalls and the like that are not germane to the discussion of the present network and will not be discussed further herein. Those of skill in the art will also appreciate that other configurations are possible, (e.g., clients directly coupled to a SAN without the use of a server or Internet, the use of Network Attached Storage (NAS) instead of a SAN and the like).

Figure 2:
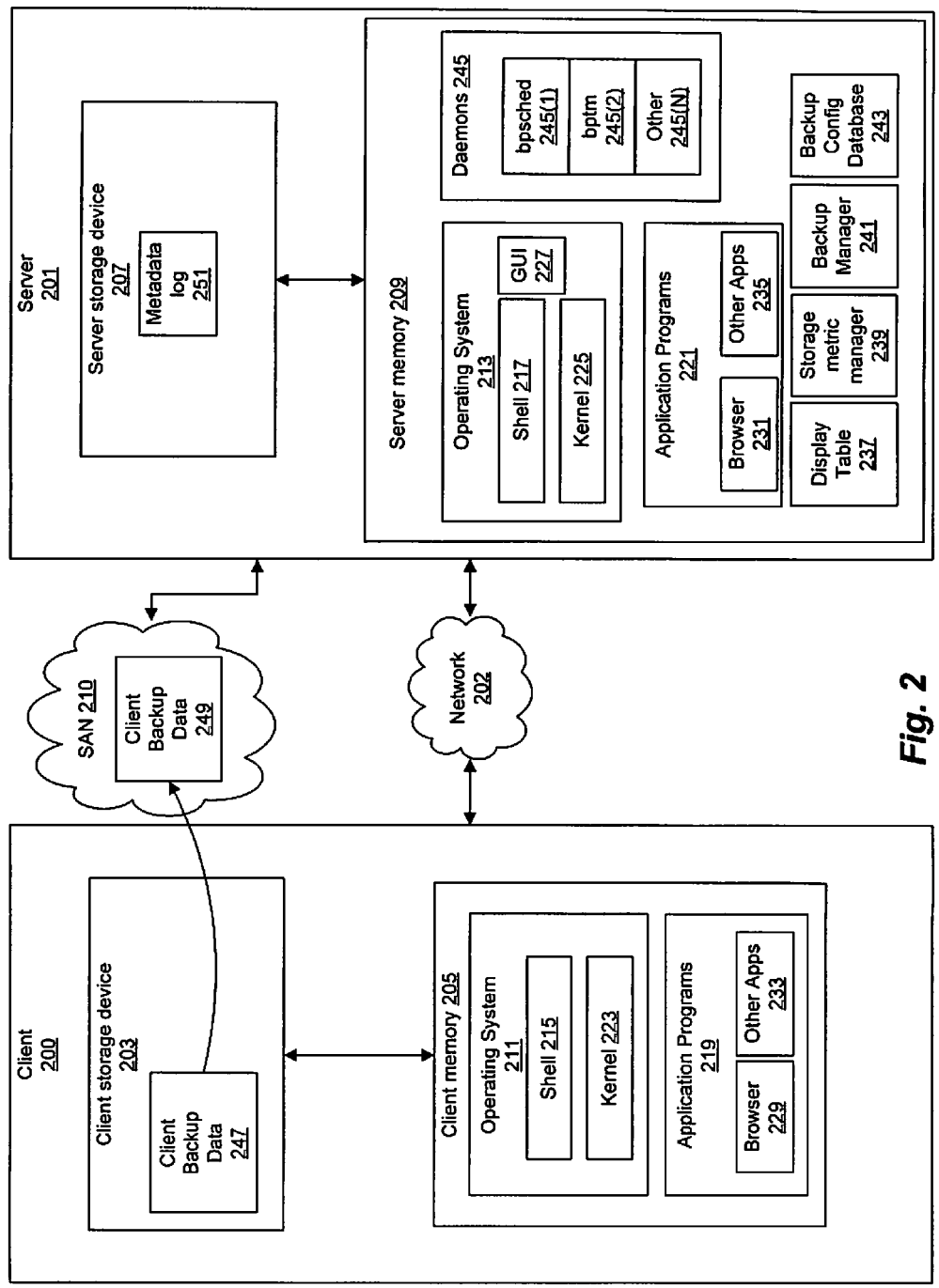
FIG. 2 is a simplified block diagram that depicts an example relationship between a client and a server.

FIG. 2 is a simplified block diagram that depicts an example relationship between a client and a server. As illustrated, a client 200 (which can be utilized to implement clients 105(1)-105(N) of FIG. 1) is coupled to a server 201 (which can be utilized to implement server 115 of FIG. 1) via a network 202 (which can be utilized to implement network 110 of FIG. 1). Client 200 is further includes a client storage device 203 and a client memory 205. Server 201 further includes a server storage device 207 and a server memory 209. Server 201 is coupled to a SAN 210 (which can be utilized to implement SAN 120 of FIG. 1)

Client memory 205 and server memory 209 have resident therein operating systems 211 and 213, which further include shells 215 and 217 (as referred to in the UNIX® operating system) for providing transparent user access to resources such as application programs 219 and 221. Generally, shells 215 and 217, also referred to as command processors in the Microsoft® Windows® operating system, are generally the highest level of the operating system hierarchy and serve as command interpreters. Shells 215 and 217 provide system prompts, interpret commands (e.g., entered by keyboard, mouse or other input media), and send the interpreted commands to the appropriate lower levels of the operating system (e.g., kernels 223 and 225) for processing. Note that while shells 215 and 217 are depicted as text-based, line-oriented user interfaces, embodiments of the present invention support other user interface modes, such as graphical (e.g. a graphical user interface (GUI) 227), voice, gestural and the like.

As depicted, operating systems 211 and 213 also include kernels 223 and 225, which include functionality for the lower levels of operating systems 211 and 213, as well as application programs 219 and 221, Such lower levels include memory management, process and task management, disk management, and mouse and keyboard management. Application programs 219 and 221 also include browsers 229 and 231, used to access network 202, word processors (not pictured), spreadsheets (also not pictured), and other application programs 233 and 235.

Server memory 209 also includes a display table 237, a storage metric manager 239, a backup manager 241, a backup configuration database 243, and a collection of daemons 245 (including bpsched 245(1), bptm 245(2), and other daemons 245(N)), all of which are discussed herein in greater detail.

Backup manager 241 controls and logs the details of backup operations between clients (e.g., client 200) and a server (e.g., server 201). In light of the present disclosure, those of skill in the art will appreciate that either of the client or the server can initiate the backup operation. The backup operation creates a copy of client backup data (e.g., client backup data 247) resident in client storage device 203 on SAN 210. The copy of client backup data 247 storage in SAN 210 is depicted as client backup data 249. During the backup operation, backup manager 241 logs events (performed by daemons 245) associated with the backup operation in metadata log 251. A more detailed example of a metadata log is presented in connection with FIG. 3 and its description herein.

Daemons 245 are computer program background processes, which run without need for user input. Those of skill in the art will appreciate that daemons 245 can be implemented as "services" or "Terminate and Stay Resident" (TSR) programs in a Microsoft® Windows® operating system, for example. One daemon that can be implemented within an embodiment of the present invention is bpsched 245(1). Bpsched 245(1) uses information from backup configuration database 243 (implemented within server memory 209, for example) to determine the clients (e.g., client 200) to backup, when to start the backups, and which storage devices to use to store the backup data (e.g., storage device 207 or SAN 210). Similarly, bptm 245(2) is a tape manager that manages media storage devices coupled to server 201. Bptm 245(2) manages the transfer of images (and other media data) between client 200 and server storage device 207 (or SAN 210). Other demons 245(N) manage other background processes on server 201, and need not be discussed further herein.

According to an embodiment of the present invention, storage metric manager 239 receives (from a user or another application) a request to generate a heat chart of a particular storage metric from metadata in metadata log 251. Storage metric manager 239 then parses metadata log 251 and extracts metadata pertaining to the particular metric. Storage metric manager 239 then enters the extracted metadata into display table 237, which includes a collection of cells (discussed herein in more detail in conjunction with FIG. 3B). Storage metric manager 239 calculates the desired storage metric for each cell in display table 237. Once calculated, storage metric manager 239 stores the calculated metric in each cell of display table 237. A color identifier is then assigned to each cell in display table 237, based on the calculated storage metric in each cell. Finally, storage metric manager 239 generates the requested heat chart by graphically displaying display table 237, with cells colored according to the corresponding color identifier. According to an alternative embodiment of the present invention, the color identifier can be generated in response to user input from a report wizard and is not stored in each cell of display table 237, discussed in greater detail in conjunction with FIG. 3C.

FIG. 3A illustrates an example of a metadata log 300. According to embodiments of the present invention, metadata log 300 (which can be used to implement metadata log 251 of FIG. 2) is implemented as a database table such as, but not limited to, a Veritas® Backup Reporter (VBR) database. As illustrated, metadata log 300 further includes a collection of columns filled with metadata describing a backup operation between a client and a server (e.g., client 200 and server 201 of FIG. 2). Metadata log 300 includes an operation ID column 302, which identifies each logged event's associated backup operation. A time column 304 indicates the time each logged event took place. A daemon column 306 identifies the daemon (e.g., daemons 245) that performed each logged event. A backuplogmessage column 308 stores comments regarding each logged event.

Those of skill in the art will appreciate that metadata log 300 can include more than one database table. An operation identifier from operation ID column 302 can be used, and can employ foreign key relationships, to enable correlation with metadata stored in other database tables.

According to an embodiment of the present invention, storage metric manager 239 uses the structured query language (SQL) (or some other type of query language) to parse metadata log 300 for specific metadata associated with a requested heat chart. For example, types of metadata that storage metric manager 339 can retrieve include, but are not limited to:

(1) Server information: master server identifier, and/or media server identifier;

(2) Storage information: image number, copy number (e.g., copy number 310), fragment number (e.g., fragment number 312), media identifier (e.g., media identifier 314), drive index (e.g., drive index 316), and/or library identifier; and (3) Backup information: a total amount of data transferred during the backup operation, a backup operation start time (e.g. backup operation start time 318), a backup operation queue time, a backup operation start write time (e.g., backup operation start write time 320), and/or a backup operation end time (e.g., backup operation end time 322).

Figure 3B:
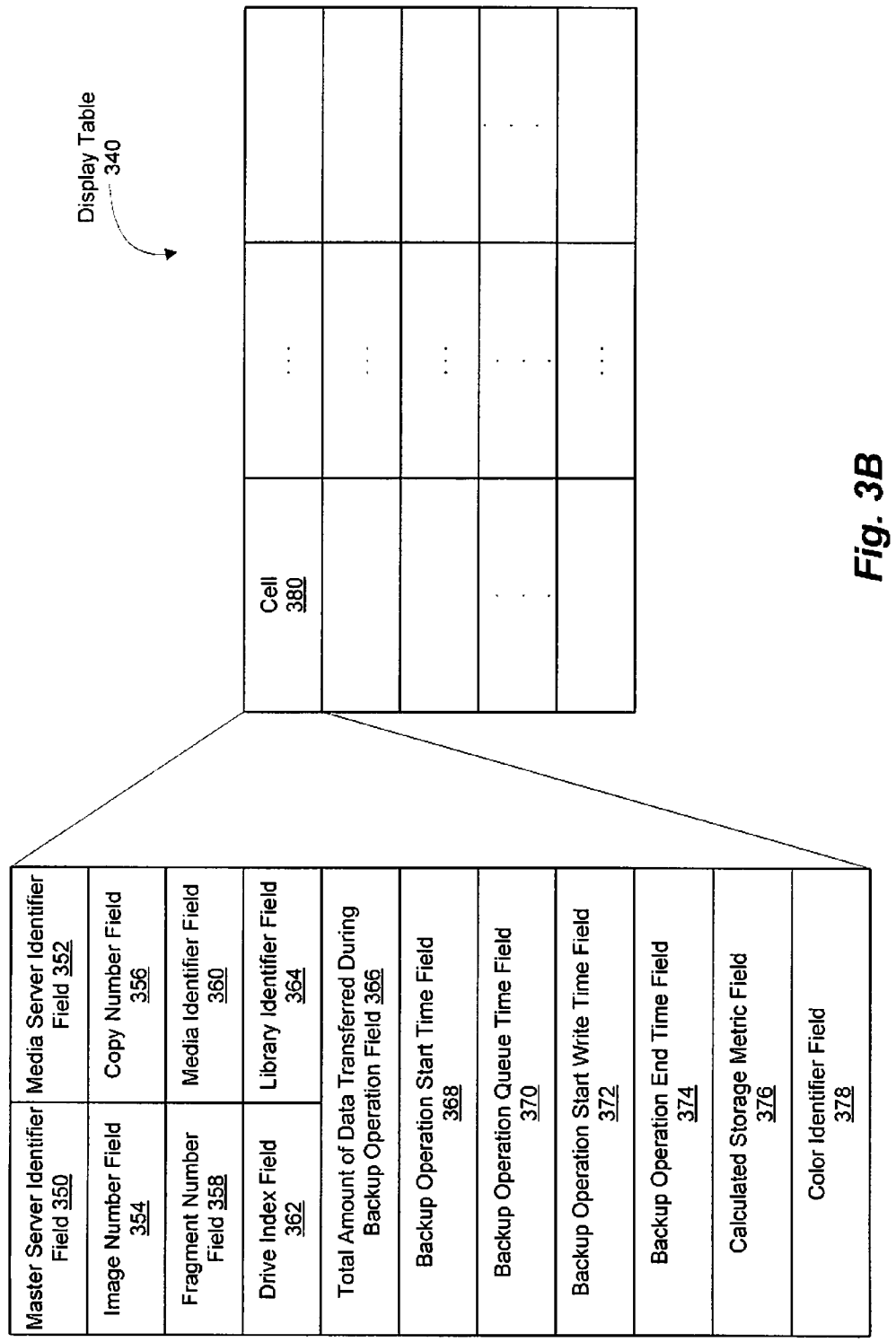
FIG. 3B depicts an example of a table and an example of contents of a cell within the table.

FIG. 3B illustrates an example of a table and an example of a cell within the table. To generate heat charts, storage metric manager 239 populates a table (e.g., a display table 340, which can be used to implement display table 237 of FIG. 2) with metadata retrieved from metadata log 300. According to an embodiment of the present invention, display table 340 can be implemented with any table, such as a spreadsheet table, database table, or another kind of table that includes multiple cells.

As illustrated, display table 340 includes multiple cells, such as cell 380. Cell 380 further includes multiple fields for storing metadata retrieved from metadata log 300. The fields in cell 380, which may be implemented as an array, record, an array of records, or any suitable data structure, include fields that correspond to the metadata discussed in conjunction with FIG. 3A, such as, but not limited to: a master server identifier field 350, a media server identifier field 352, an image number field 354, a copy number field 356, a fragment number field 358, a media identifier field 360, a drive index field 362, a library identifier field 364, a total amount of data transferred during backup operation field 366, a backup operation start time field 368, a backup operation queue time field 370, a backup operation start write time field 372, and a backup operation end time field 374.

Depending on the type of heat chart requested, storage metric manager 239 performs calculations on the retrieved metadata to generate a specific storage device metric, the results of which are also stored in calculated storage metric field 376 within each cell (e.g., cell 380) in display table 340. This is discussed in greater detail in conjunction with FIGS. 4, 5, and 6.

Once the storage metric calculations are completed, storage metric manager 239 assigns a color identifier (signifying the appropriate color (or shade thereof)) to color identifier field 378 of each cell in display table 340. The color identifier is assigned to each cell based on the result of the storage metric calculation. In an alternative embodiment of the present invention, the color identifier can be generated in response to user input from a report wizard, and is not stored in color identifier field 378 of each cell in display table 237. This alternative embodiment is discussed in greater detail in conjunction with FIG. 3C. This alternative embodiment can include or exclude the use of color identifier field 378 of each cell 380 of display table 340.

FIG. 3C is an example of a report wizard 381. As previously discussed, according to an alternative embodiment of the present invention, the color identifier can be generated in response to user input from a report wizard and is not stored in each cell of display table 237. Report wizard 381 enables a user (e.g., system administrator) to determine the time period in which the requested heat chart is displayed. For example, report wizard 381 enables a user to specify a relative date, an absolute date, and/or a specific time period (e.g., 15 days). Report time frame grouping 382 enables a user to specific the interval size of the requested heat chart (e.g., 1 hour). Display options 384 enables a user to specify the ranges and colors (or shades thereof) to apply to data values in the requested heat chart. It will be appreciated that embodiments of the present invention enable any number of ranges and colors to be specified, and are not limited to four ranges and colors. A user can use report wizard 381 to vary the colors and ranges applied to data values in the heat chart to customize the heat chart to the user's preferences.

Figure 4:
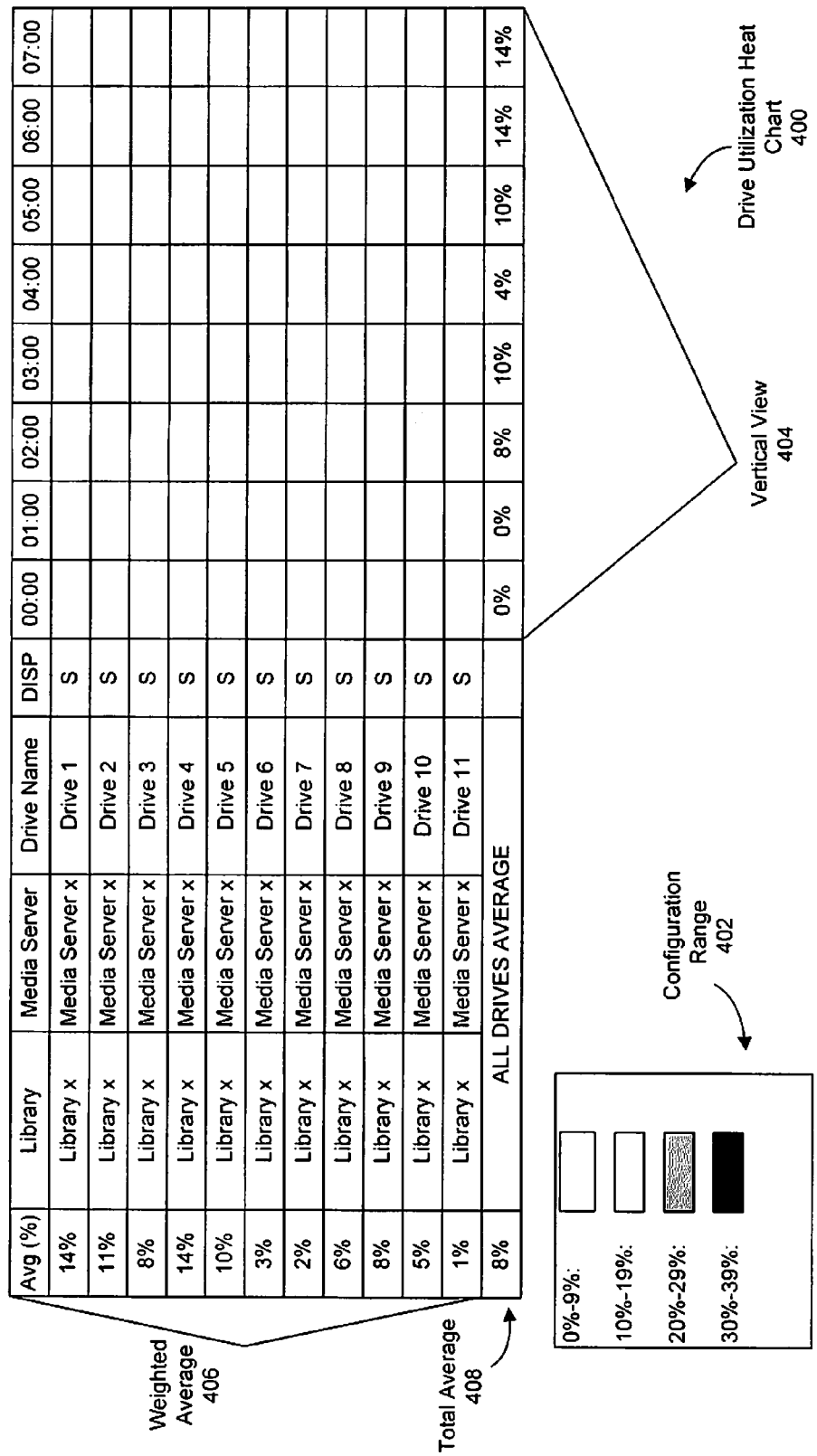
FIG. 4 depicts an example of a drive utilization heat chart.

FIG. 4 depicts an example of a drive utilization heat chart (e.g., a drive utilization heat chart 400). If a user or another application requests the generation of a drive utilization heat chart, storage metric manager 239 calculates percent drive utilization metric for each cell in the table.

According to an embodiment of the present invention, the percent drive utilization (DU %) of a storage device is 100× $(t_{in-use})/(t_{measurement})$, where:

$t_{in-use}$=time when the storage device is in use;
$t_{start}$=backup operation start time;
$t_{start-write}$=backup operation start write time;
$t_{measurement}$=total time of measurement period; and
$t_{in-use}=t_{end}-t_{start-write}$.

As illustrated in FIG. 4, drive utilization heat chart 400 includes a customizable configuration range 402, which enables the user to dictate the colors assigned to the cells, according to one embodiment of the present invention. Or, according to an alternative embodiment of the present invention, configuration range 402 acts as a legend to indicate to a user the colors or shades at correspond to which data point ranges. It will be appreciated that embodiments of the present invention enable any number of ranges and colors to be specified and are not limited to four ranges and colors. Also, the vertical view 404 enables a view of the drive utilization of all the storage devices by a predetermined time period (e.g., hourly, every fifteen minutes or other time period). Weighted average 406 represents the overall drive utilization of a single storage device over all time periods. Total average 408 is a composite summary of drive utilization across all storage devices and time periods. By viewing drive utilization heat chart 400, a user (e.g., system administrator) can determine the times that the storage devices coupled to server 201 (or within SAN 210) are used the most for backups and which particular storage device(s) are used the most.

Figure 5:
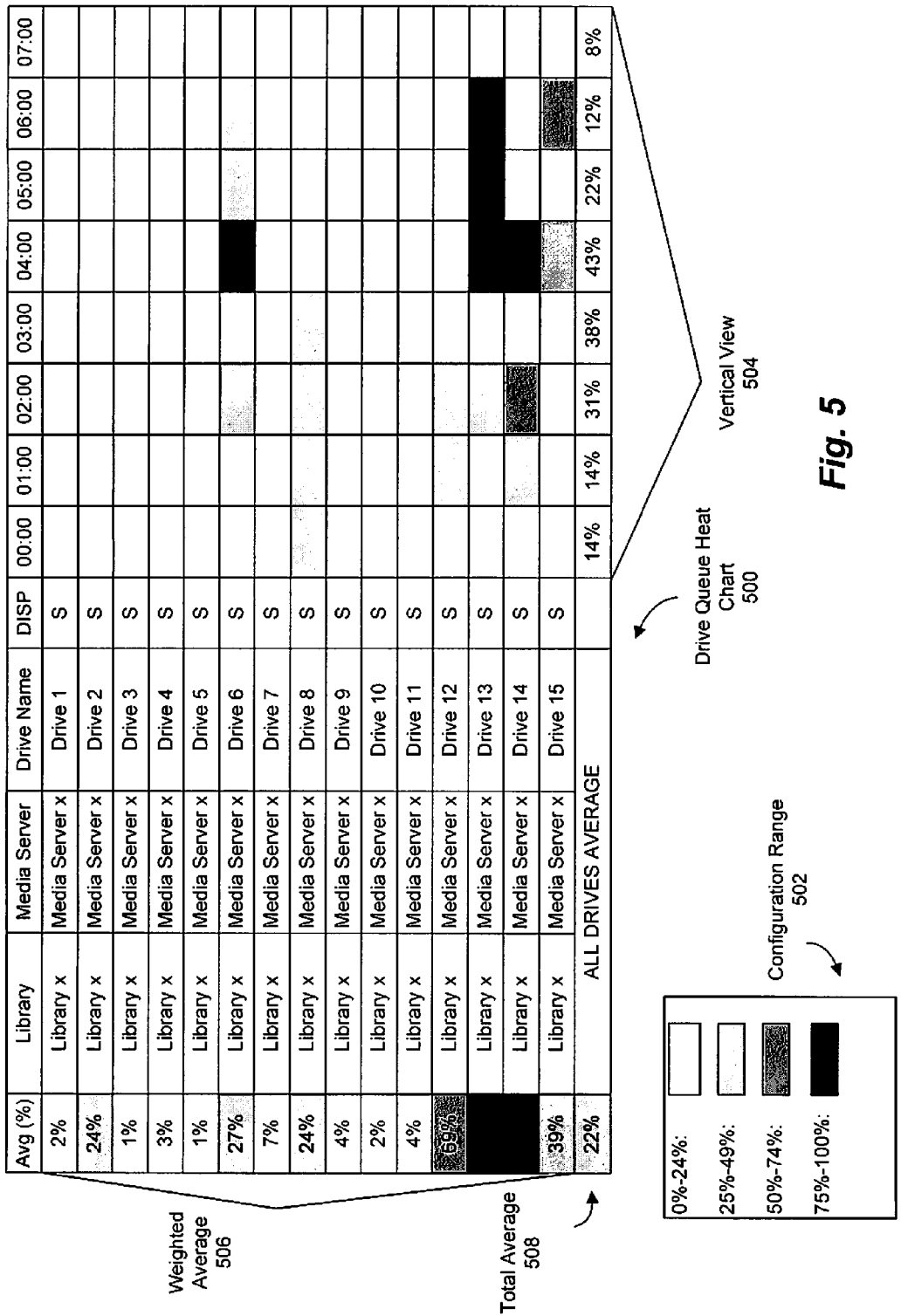
FIG. 5 illustrates an example of a drive queue heat chart.

FIG. 5 illustrates an example of a drive queue heat chart (e.g., a drive queue heat chart 500). If a user or another application requests the generation of a drive queue heat chart, storage metric manager 239 calculates a percent queue time metric for each cell in the table. The percent drive queue (DQ %) of a storage device is $100 \times ((t_{start} - t_{start-write})/(t_{start} - t_{end}))$, where:

$t_{start}$=backup operation start time;
$t_{start-write}$=backup operation start write time; and
$t_{end}$=backup operation end time.

Once backup manager 241 assigns a particular backup operation to a particular storage device, an important storage metric to consider will be the drive queue metric, which determines the amount of time that a backup operation is in a queue (i.e., not actively writing data to the particular storage device) before the backup operation writing actually begins. The longer the backup operation waits in a queue, the more inefficient the backup operation becomes. Thus, referring back to FIG. 5, drive queue heat chart 500 indicates the amount time of time each storage device (e.g., drives 1-15) is in an inactive state over a predetermined period of time, and so, awaiting data. Darker colors indicate a higher percentage queue time.

Drive queue heat chart 500 includes a customizable configuration range 502, which enables the user to dictate the colors assigned to the cells, according to one embodiment of the present invention. Or, according to an alternative embodiment of the present invention, configuration range 502 acts as a legend to indicate to a user the colors or shades at correspond to which data point ranges. It will be appreciated that embodiments of the present invention enable any number of ranges and colors to be specified and are not limited to four ranges and colors. Vertical view 504 enables a view of the drive queue percentage of all the storage devices by a predetermined time period (e.g., hourly or some other time period). Weighted average 506 determines the overall drive queue percentage of a single storage device over all time periods. Total average 508 is a composite summary of the drive queue percentage across all storage devices and time periods. By viewing drive queue heat chart 500, a user (e.g., system administrator) can determine the point(s) of time at which the storage devices (used by server 201) have the longest drive queue times and which storage devices have exhibit relatively longer drive queue times.

Figure 6:
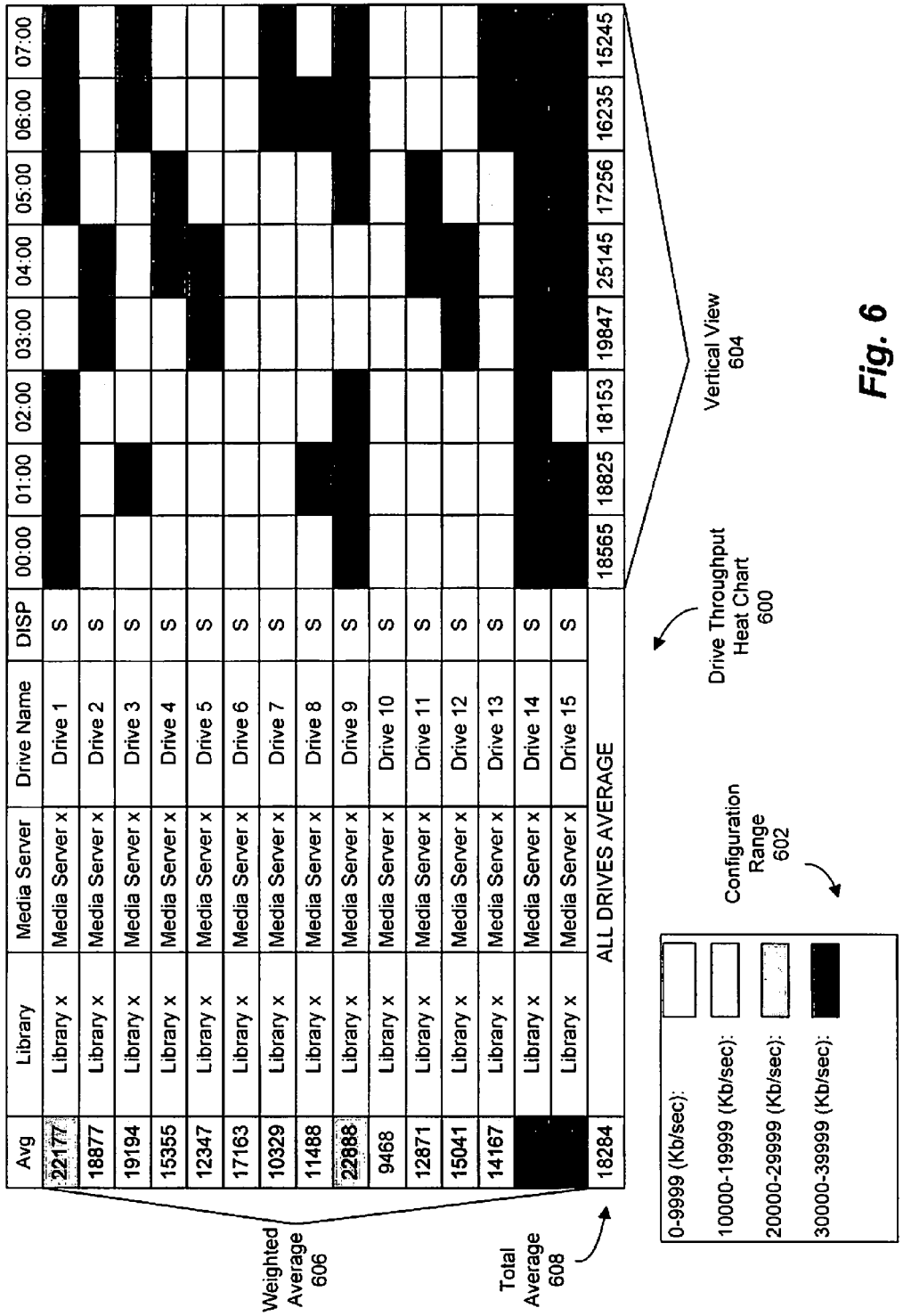
FIG. 6 depicts an example of a drive throughput heat chart.

FIG. 6 depicts an example of a drive throughput heat chart (e.g., a drive throughput heat chart 600). If a user or another application requests the generation of a drive throughput heat chart, storage metric manager 239 calculates a storage device throughput metric for each cell in the table. The storage device throughput value (TP) is $100 \times ((D_{total}) - (t_{start-write} - t_{end}))$, where:

$D_{total}$=a total amount of data transferred during the backup operation;
$t_{start-write}$=backup operation start write time; and
$t_{end}$=backup operation end time.

Drive throughput heat chart 600 depicted in FIG. 6 enables a user (e.g., system administrator) to determine the rate at which data flows to and/or from the storage devices over time. According to an embodiment of the present invention, the rate metric for drive throughput is in Kbytes/second, but those of skill in the art will appreciate that the present invention is not limited to such a rate metric, but any rate metric may be utilized. In an embodiment of the present invention, the drive throughput for a backup operation is a weighted average of each copy and fragment of data transferred.

Drive throughput heat chart 600 includes a customizable configuration range 602, which enables the user to dictate the colors assigned to the cells, according to one embodiment of the present invention. Or, according to an alternative embodiment of the present invention, configuration range 602 acts as a legend to indicate to a user the colors or shades at correspond to which data point ranges. Vertical view 604 presents a view of the drive throughput of all the storage devices by a predetermined time period (e.g., hourly or some other time period). Weighted average 606 determines the overall drive throughput of a single storage device over all time periods. Total average 608 is a composite summary of the drive throughput across all storage devices and time periods. By viewing drive throughput heat chart 600, a user (e.g., system administrator) can determine the storage devices (used by server 201) that have the highest drive throughput at particular times and the overall drive throughput of the storage devices used by server 201.

Figure 7:
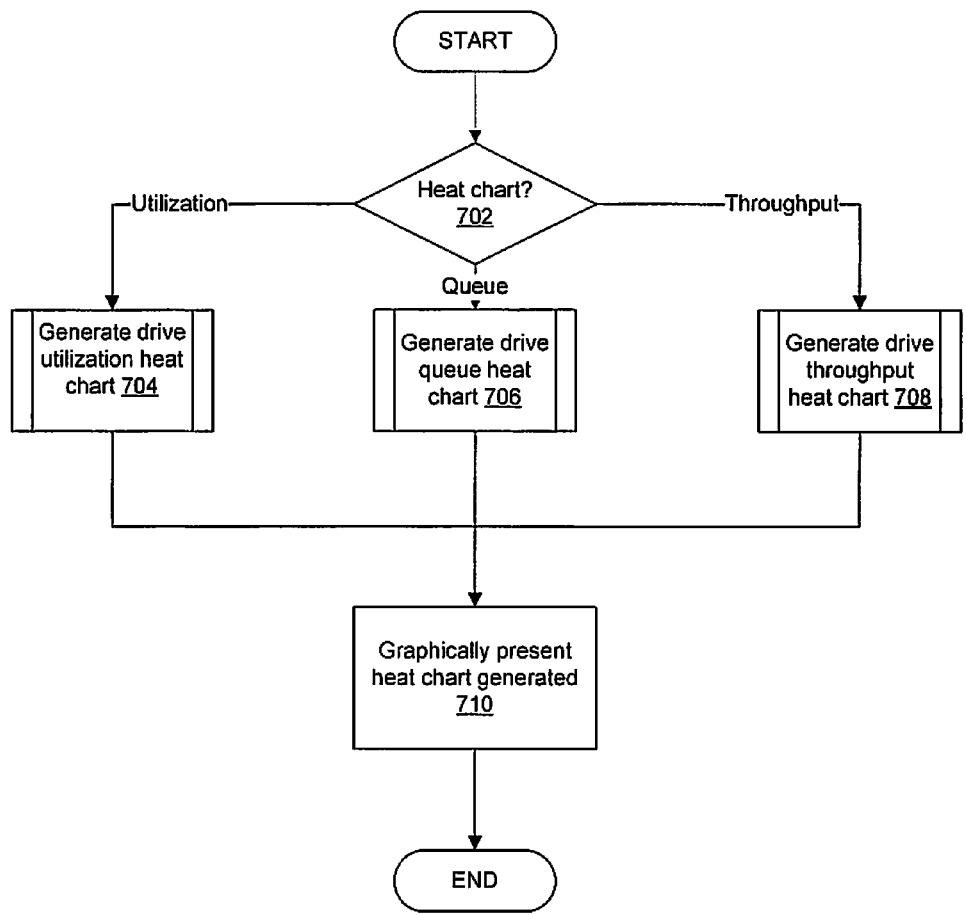
FIG. 7 is a simplified flow diagram illustrating an example of the operations carried out by a server in generating a heat chart.

FIG. 7 is a simplified flow diagram illustrating an example of the operations generally carried out by a server in generating a heat chart generation operation. The process begins with a storage metric manager (e.g., storage metric manager 239), in the server, receiving input from a user (e.g., a system administrator) for the type of heat chart desired (step 702). As previously discussed, an embodiment of the present invention generates drive utilization, drive queue, and drive throughput heat charts. If the user requests a drive utilization heat chart, the storage metric manager performs the "generate drive utilization heat chart" process (step 704). If the user requests a drive queue heat chart, the storage metric manager performs the "generate drive queue heat chart" process (step 706). If the user requests a drive throughput heat chart, the storage metric manager performs the "generate drive throughput heat chart" process (step 708). After the requested process is completed, a graphical user interface (e.g., graphical user interface (GUI) 227) displays the requested heat chart (e.g., display table 237) on a display (e.g., display screen 1124, via display adapter 1126) for review by the user (step 710).

Figure 8:
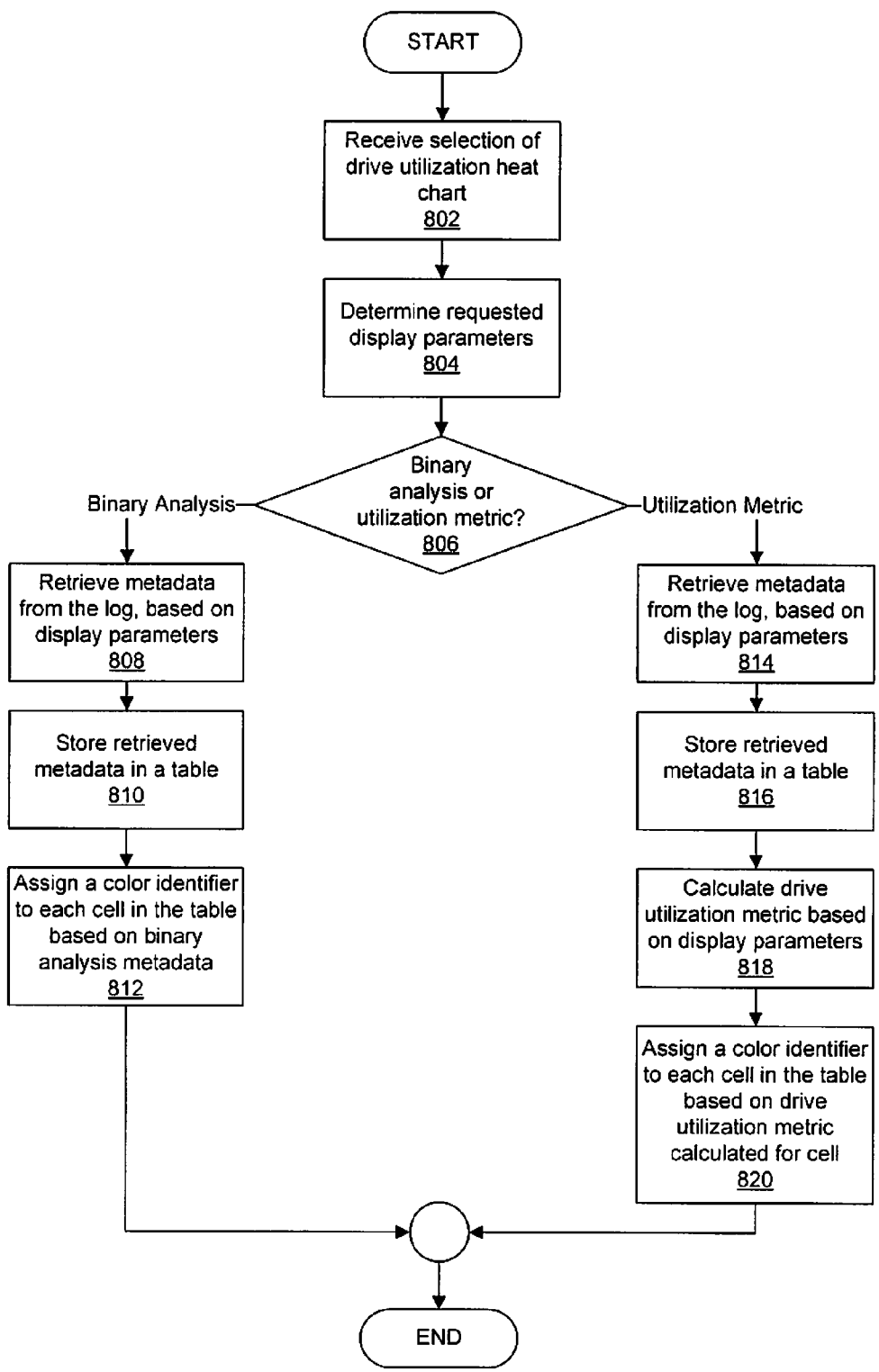
FIG. 8 is a simplified flow diagram depicting an example drive utilization heat chart generation operation carried out by the server.

FIG. 8 is a simplified flow diagram depicting an example of the operations generally carried out by a server in generating a drive utilization heat chart. The process begins with the storage metric manager receiving a request for a drive utilization heat chart (step 802). The storage metric manager determines requested display parameters for the drive utilization heat chart (step 804). Examples of display parameters include, but are not limited to: the time period for the drive utilization heat chart (e.g., display drive utilization for all drives over a 24 hour range), the number of storage devices to display the drive utilization information and the like. Once the requested display parameters are received, the storage metric manager determines if the user (or other application) is requesting a binary analysis heat chart or a utilization metric heat chart (step 806). A binary analysis heat chart indicates whether a particular storage device is active for a given time period. If a binary analysis heat chart is requested, storage metric manager retrieves metadata from the metadata log based on the received display parameters (step 808). The storage metric manager stores the retrieved metadata in a display table (e.g., display table 237) and assigns a color identifier to each cell in the table based on the binary analysis metadata (steps 810 and 812). The process then ends, proceeding to step 710 of FIG. 7.

If however, a utilization metric heat chart is requested, the storage metric manager retrieves metadata from the metadata log based on the received display parameters (step 814). The storage metric manager stores the retrieved metadata in the display table (step 816). The storage metric manager then calculates the drive utilization metric for each cell in the display table based on the display parameters, as described in conjunction with FIG. 4 (step 818). The storage metric manager assigns a color identifier to each cell in the display table based on the calculated drive utilization metric for the cell (step 820). The process then continues to step 710 of FIG. 7.

Figure 9:
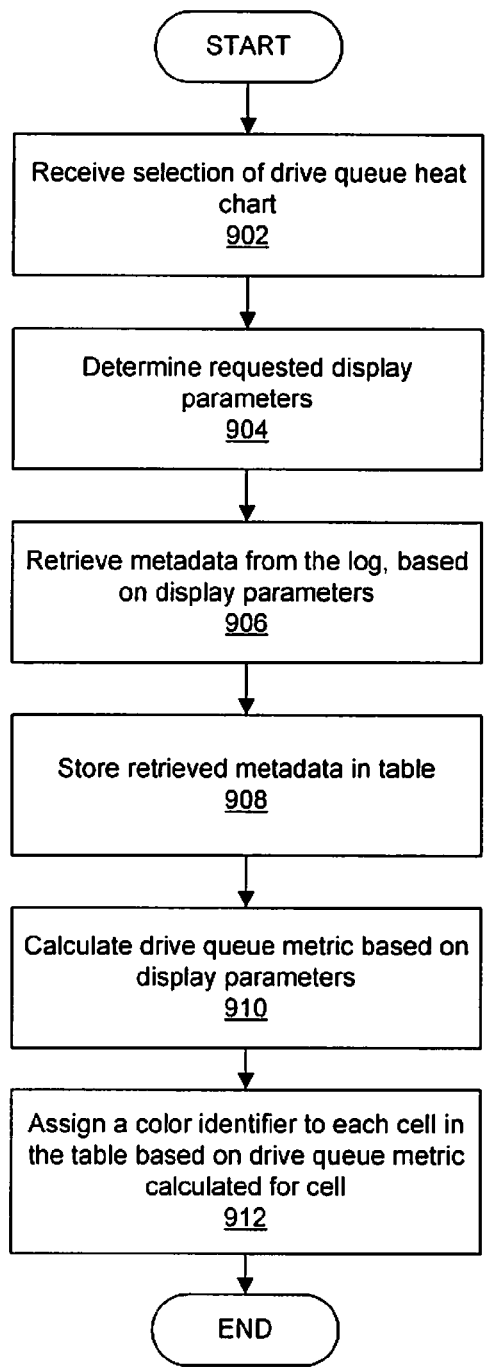
FIG. 9 is a simplified flow diagram illustrating an example drive queue heat chart generation operation carried out by the server.

FIG. 9 is a simplified flow diagram illustrating an example of the operations generally carried out by a server in generating a drive queue chart. The process begins with the storage metric manager receiving a request for a drive queue heat chart (step 902). The storage metric manager determines requested display parameters for the drive queue heat chart (step 904). Examples of display parameters include, but are not limited to: the time period for the drive queue heat chart (e.g., display drive queue time for all drives over a 24 hour range), the number of storage devices to display the drive queue information and the like. The storage metric manager retrieves metadata from the metadata log based on the received display parameters (step 906), and stores the retrieved metadata in the display table (step 908). The storage metric manager then calculates the drive queue metric for each cell in the display table, based on the display parameters as described in conjunction with FIG. 5 (step 910). The storage metric manager assigns a color identifier to each cell in the display table based on the calculated drive queue metric for the cell (step 912). The process then concludes, and returns to step 710 of FIG. 7.

Figure 10:
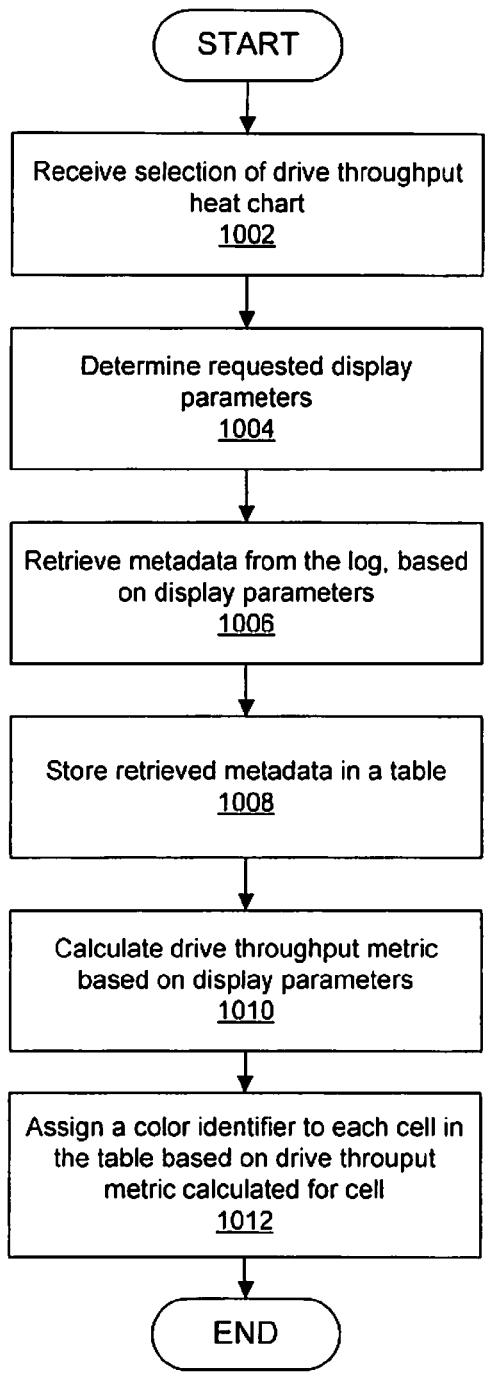
FIG. 10 is a simplified flow diagram depicting an example drive throughput heat chart generation operation carried out by the server.

FIG. 10 is a simplified flow diagram depicting an example of the operations generally carried out by a server in generating a drive throughput heat chart. The process begins with the storage metric manager receiving a request for a drive throughput heat chart (step 1002). The storage metric manager determines requested display parameters for the drive throughput heat chart (step 1004). Examples of display parameters include, but are not limited to: the time period for the drive throughput heat chart (e.g., display drive throughput for all drives over a 24 hour range), the number of storage devices to display the drive throughput information and the like. The storage metric manager retrieves metadata from the metadata log based on the received display parameters (step 1006), and stores the retrieved metadata in the display table (step 1008). The storage metric manager then calculates the drive throughput metric for each cell in the display table, based on the display parameters as described in conjunction with FIG. 6 (step 1010). The storage metric manager assigns a color identifier to each cell in the display table based on the calculated drive throughput metric for the cell (step 1012). The process then concludes, returning back to step 710 of FIG. 7.

An Example Computing Environment

Elements of network architecture 100 can be implemented using a variety of computer systems and networks. And example of one such computing environment is described below with reference to FIG. 11.

Figure 11:
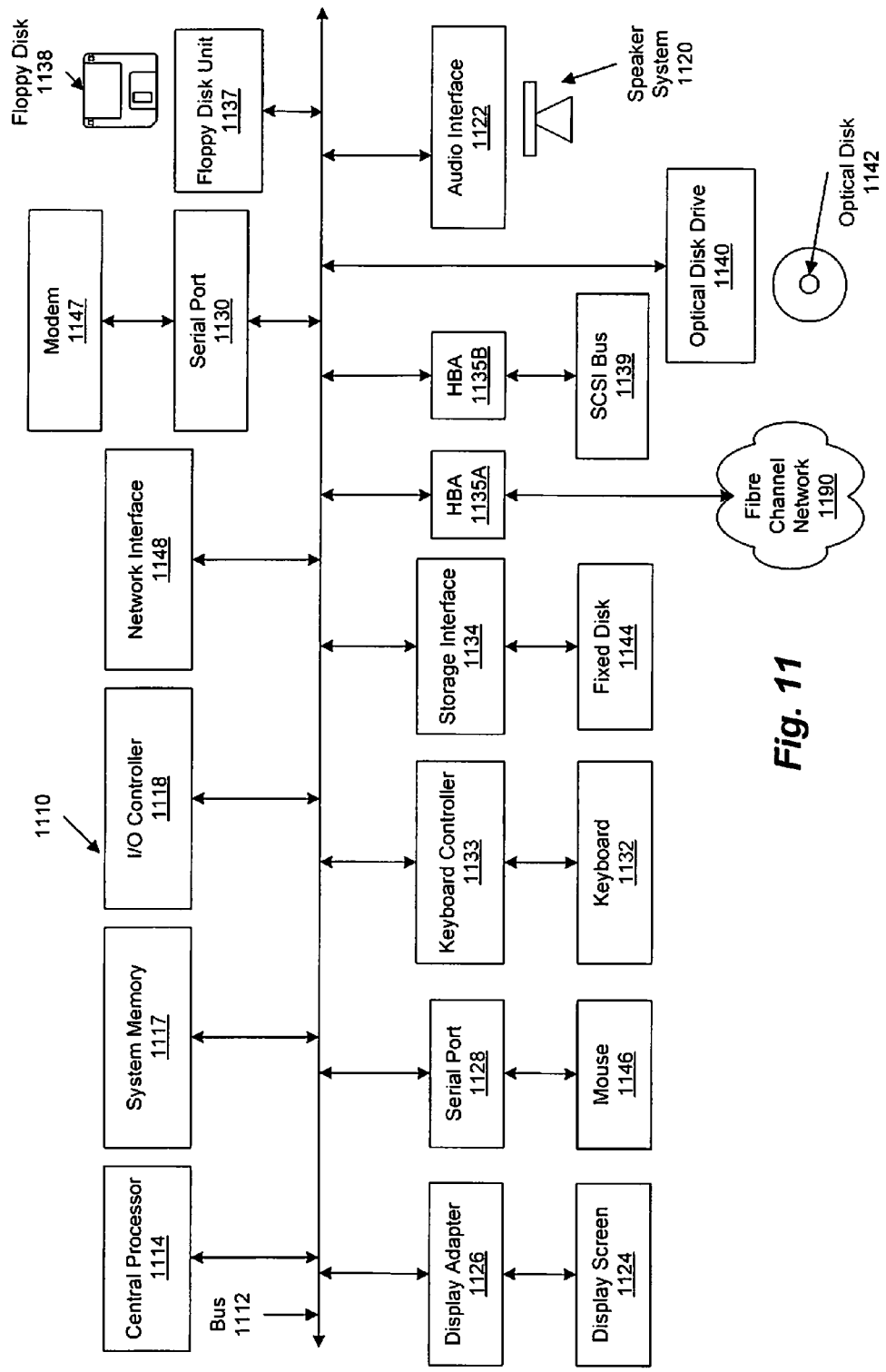
FIG. 11 is a simplified block diagram that illustrates an example of a computer system suitable for implementing embodiments of the present invention.

FIG. 11 depicts a block diagram of a computer system 1110 suitable for implementing a server (e.g., server 115 of FIG. 1 and server 201 of FIG. 2), as well as the clients (e.g., clients 105(1)-105(N) of FIG. 1 and client 200 of FIG. 2) used therein. Computer system 1110 includes a bus 1112, which interconnects major subsystems of computer system 1110, such as a central processor 1114, a system memory 1117 (typically random-access memory (RAM), but which may also include read-only memory (ROM), flash ROM, or the like), an input/output controller 1118, an external audio device, such as speaker system 1120 via an audio output interface 1122, an external device, such as a display screen 1124 via display adapter 1126, serial ports 1128 and 1130, a keyboard 1132 (interfaced with keyboard controller 1133), a storage interface 1134, a floppy disk drive 1137 operative to receive a floppy disk 1138, a host bus adapter (HBA) interface card 1135A operative to connect with a Fibre Channel network 1190, a host bust adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown) and random access memory (RAM) (not shown), as previously noted. RAM is generally the main memory into which operating system and application programs are loaded. ROM or flash memory can contain, among other code, the Basic Input-Output system (BIOS) which controls basic hardware operation such as the interaction with peripheral components. Applications resident with computer system 1110 are generally stored on and accessed via a computer-readable medium, such as hard disk drive (e.g., fixed disk 1144), an optical drive (e.g., optical drive 1140), a floppy disk unit 1137, or other storage medium.

Storage interface 1134, as with other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modern 1147 may provide a direct connection to a remote server via a telephone link or to the Internet via an internet service provider (ISP). Network interface 1148 may provide a direct connection to a remote server via a direct network link to the Internet via a point-of-presence (POP). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g. document scanners, digital cameras, and so on). Conversely, all of the devices shown in FIG. 11 need not be present. The devices and subsystems can be interconnected in different ways from that shown in FIG. 11. The operation of the computer system such as that shown in FIG. 11 is readily known in the art and is not discussed in detail in this application. Code to implement the previously-described features can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or other known operating system.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving a request to generate graphical representations of storage metrics for a first storage device and a second storage device of a plurality of storage devices, wherein
        the storage metrics relate to at least one backup operation for each of the first and second storage devices, and
        the request comprises a parameter;
    retrieving metadata from at least one log, wherein
        the at least one log comprises a plurality of metadata for a plurality of backup operations,
        a first metadata of the plurality of metadata is associated with at least one backup operation for the first storage device,
        a second metadata of the plurality of metadata is associated with at least one backup operation for the second storage device,
        the plurality of backup operations comprises
            the at least one backup operation for the first storage device, and
            the at least one backup operation for the second storage device,
        the retrieving the metadata comprises retrieving the first and second metadata based on the parameter,
        the at least one backup operation for the first storage device comprises a backup of data to the first storage device, and
        the at least one backup operation for the second storage device comprises a backup of data to the second storage device;
    calculating a first storage metric for the first storage device, wherein the calculating the first storage metric utilizes the first metadata, and the calculating the first storage metric is based on the parameter;
    calculating a second storage metric for the second storage device, wherein the calculating the second storage metric utilizes the second metadata, and the calculating the second storage metric is based on the parameter; and
    displaying the graphical representations, wherein
        the displaying is performed in accordance with the request,
        the graphical representations are displayed in a chart, and
        the graphical representations include
            first graphical representations of the first storage metric, and
            second graphical representations of the second storage metric.

2. The method of claim 1, further comprising:
    storing the first and second metadata and the first and second storage metric in a table, wherein
        the displaying uses
            the first and second metadata, and
            the first and second storage metric; and
    assigning at least one respective color identifier to each of the first and second metadata.

3. The method of claim 2, further comprising:
    storing the at least one respective color identifier in the table.

4. The method of claim 2, wherein
    the chart comprises a heat chart, and
    the displaying comprises
        coloring each of the graphical representations in the heat chart, wherein the coloring is performed according to the at least one respective color identifier.

5. The method of claim 2, wherein the assigning further comprises:
    assigning the at least one respective color identifier to each of the first and second metadata based on the first and second storage metric, respectively.

6. The method of claim 3, wherein
    the log comprises a plurality of database tables, and
    the plurality of database tables comprise the plurality of metadata for the plurality of backup operations.

7. The method of claim 6, wherein the metadata further comprises:
    a respective backup operation identifier, wherein
        the respective backup operation identifier is configured to be stored in at least a first database table among the plurality database tables,
        the respective backup operation identifier is configured to identify the at least one backup operation for the first device or the at least one backup operation for the second device, and
        the respective backup operation identifier is configured to utilize foreign key relationships with the metadata stored in other database tables among the plurality of database tables.

8. The method of claim 1, wherein the metadata further comprises:
    server information, further comprising
        a master server identifier, and
        a media server identifier.

9. The method of claim 1, wherein the metadata further comprises:
    storage information, further comprising
        an image identifier,
        a copy number,
        a fragment number,
        a media identifier,
        a drive index, and
        a library identifier.

10. The method of claim 1, wherein the metadata further comprises:
    backup information, further comprising, for the at least one backup operation for the first device or the at least one backup operation for the second device, a total amount of data transferred during at least one respective backup operation,
a backup operation start time,
a backup operation queue time,
a backup operation start write time, and
a backup operation end time.

11. The method of claim 10, wherein the calculating the first and the second storage metric of the first and second storage device, respectively, further comprises:
calculating a percent queue time, wherein
the percent queue time equals $$100\times((\text{the backup start time}-\text{the backup start write time})/(\text{the backup start time}-\text{the backup end time})).$$

12. The method of claim 10, wherein the first and second storage metric further comprises:
a storage device throughput value.

13. The method of claim 12, wherein
the storage device throughput value is equal to $$100\times((\text{the total amount of data transferred during the at least one respective backup operation})/(\text{the backup operation start write time}-\text{the backup operation end time})).$$

14. The method of claim 1, wherein the calculating the first storage metric of the first storage device further comprises:
calculating a percent drive utilization, wherein
the percent drive utilization equals $$100\times((\text{times when the at least one storage device is in use})/(\text{a total time of measurement period})).$$

15. An apparatus, comprising:
at least one storage device;
means for receiving a request to generate graphical representations of storage metrics for a first storage device and a second storage device of a plurality of storage devices, wherein
the storage metrics relate to at least one backup operation for each of the first and second storage devices, and
the request comprises a parameter;
means for retrieving metadata from at least one log, wherein
the at least one log comprises a plurality of metadata for a plurality of backup operations,
a first metadata of the plurality of metadata is associated with at least one backup operation for the first storage device,
a second metadata of the plurality of metadata is associated with at least one backup operation for the second storage device,
the plurality of backup operations comprises
the at least one backup operation for the first storage device, and
the at least one backup operation for the second storage device,
the retrieving the metadata comprises retrieving the first and second metadata based on the parameter, and
the at least one backup operation for the first storage device comprises a backup of data to the first storage device, and
the at least one backup operation for the second storage device comprises a backup of data to the second storage device;
means for first calculating a first storage metric for the first storage device, wherein
the means for first calculating utilizes the first metadata, and
the first calculating the first storage metric is based on the parameter;
means for second calculating a second storage metric for the second storage device, wherein
the second calculating utilizes the second metadata,
the second calculating the second storage metric is based on the parameter, and
the means for first calculating, the means for second calculating, the means for retrieving, and the at least one storage device are coupled to one another; and
means for displaying the graphical representations, wherein
the means for displaying is configured to display the graphical representation in accordance with the request,
the graphical representations are displayed in a chart, and
the graphical representations include
first graphical representations of the first storage metric, and
second graphical representations of the second storage metric.

16. The apparatus of claim 15, further comprising:
means for storing the first and second metadata and the first and second storage metric in a table, wherein
the means for displaying uses
the first and second metadata, and
the first and second storage metric; and
means for assigning at least one respective color identifier to each of the first and second metadata.

17. The apparatus of claim 16, further comprising:
means for storing the at least one respective color identifier in the table.

18. The apparatus of claim 16, wherein
the chart comprises a heat chart, and
the means for displaying comprises
means for coloring each of the graphical representations in the heat chart, wherein
the coloring is performed according to the at least one respective color identifier.

19. The apparatus of claim 16, the means for assigning further comprises:
means for assigning the at least one respective color identifier to the first and second metadata based on the first and second storage metric, respectively.

20. A computer-readable medium comprising computer-executable code, wherein executed by a processor, generates instructions configured to:
receive a request to generate graphical representations of storage metrics for a first storage device and a second storage device of a plurality of storage devices, wherein
the storage metrics relate to at least one backup operation for each of the first and second storage devices, and
the request comprises a parameter;
retrieve metadata from at least one log, wherein
the at least one log comprises a plurality of metadata for a plurality of backup operations,
a first metadata of the plurality of metadata is associated with at least one backup operation for the first storage device,
a second metadata of the plurality of metadata is associated with at least one backup operation for the second storage device,
the plurality of backup operations comprises the at least one backup operation for the first storage device, and the at least one backup operation for the second storage device, the retrieving the metadata comprises retrieving the first and second metadata based on the parameter, and the at least one backup operation for the first storage device comprises a backup of data to the first storage device, and the at least one backup operation for the second storage device comprises a backup of data to the second storage device;

calculate a first storage metric for the first storage device, wherein the calculating utilizes the first metadata, and the calculating the first storage metric is based on the parameter;

calculate a second storage metric for the second storage device, wherein the calculating utilizes the second metadata, and the calculating the second storage metric is based on the parameter; and display the graphical representation, wherein the displaying is performed in accordance with the request, the graphical representations are displayed in a chart, and the graphical representations include first graphical representations of the first storage metric, and second graphical representations of the second storage metric.

21. The computer-readable medium of claim 20, wherein the instructions are further configured to:

store the first and second metadata and the first and second storage metric in a table, wherein the displaying uses the first and second metadata, and the first and second storage metric; and assign at least one respective color identifier to each of the first and second metadata.

22. The computer-readable medium of claim 21, wherein the instructions are further configured to:

store the at least one respective color identifier in the table.

23. The computer-readable medium of claim 21, wherein the chart comprises a heat chart, and the instructions to display further comprise instructions to color each of the graphical representations in the heat chart, wherein the coloring is performed according to the at least one respective color identifier.

24. The computer-readable medium of claim 21, wherein the instructions to assign further comprise instructions configured to:

assign the at least one respective color identifier to each of the first and second metadata based on the first and second storage metric, respectively.

* * * * *